United States Patent [19]

Stockburger

[11] 4,427,557

[45] Jan. 24, 1984

[54] ANIONIC TEXTILE TREATING COMPOSITIONS

[75] Inventor: George J. Stockburger, Wilmington, Del.

[73] Assignee: ICI Americas Inc., Wilmington, Del.

[21] Appl. No.: 466,580

[22] Filed: Feb. 15, 1983

Related U.S. Application Data

[63] Continuation-in-part of Ser. No. 263,445, May 14, 1981, abandoned.

[51] Int. Cl.$^3$ .............................................. D06M 9/00
[52] U.S. Cl. .................................. 252/8.7; 524/401; 524/601; 528/293; 528/295; 528/300
[58] Field of Search ............... 524/401, 601; 528/293, 528/300, 295; 252/8.7

[56] References Cited

U.S. PATENT DOCUMENTS

| | | | |
|---|---|---|---|
| 3,563,942 | 2/1971 | Heiberger | 526/602 |
| 3,725,348 | 4/1973 | Harrison et al. | 528/295 X |
| 3,725,351 | 4/1973 | Harrison et al. | 528/295 X |
| 3,978,262 | 8/1976 | Fritz et al. | 528/293 X |
| 4,022,740 | 5/1977 | Morie et al. | 524/386 |
| 4,104,262 | 8/1978 | Schade | 528/295 |
| 4,156,073 | 5/1979 | Login | 528/295 |
| 4,215,026 | 7/1980 | Login | 528/295 X |
| 4,233,196 | 11/1980 | Sublett | 528/295 X |

*Primary Examiner*—Lucille M. Phynes
*Attorney, Agent, or Firm*—Richard A. Rowe

[57] ABSTRACT

Disclosed are copolymers having molecular weight from 2,000 to 10,000 and comprising a copolymer of ethylene glycol, polyethylene glycol having an average molecular weight of from 200 to 1000 aromatic dicarboxylic acid containing only carbon, hydrogen, and oxygen atoms and alkali metal salt of a sulfonated aromatic dicarboxylic acid containing only carbon, oxygen, hydrogen and sulfur atoms. The copolymers are useful for preparing anionic textile treating compositions.

20 Claims, No Drawings

ANIONIC TEXTILE TREATING COMPOSITIONS

This is a continuation-in-part of the now abandoned application Ser. No. 263,445, filed May 14, 1981.

This invention relates to copolyesters, to compositions for treating textile materials, to a method of improving the properties of textile materials, and to textile materials having improved properties. More particularly, this invention relates to aqueous dispersions which are suitable for imparting improved durable soil release properties to textile materials containing polyesters.

Textile materials containing substantial quantities of polyester fibers have been favored over all cotton garments because the polyester fibers give improved abrasion resistance and crease resistance to the garments. However, garments containing a substantial quantity of polyester fibers have exhibited a pronounced tendency to retain soil and stains, particularly oily stains. Furthermore, these garments have been found to resist release of the soil or stains even upon exposure to repeated laundering. In all liklihood the propensity of polyester fibers to accumulate stains is due to the inherently oleophilic structure of polyester fibers. In an attempt to overcome these inherent difficulties with garments made with polyester fibers, the industry has resorted to the use of a variety of textile treating compositions which provide a degree of soil resistance, wicking, resistance to soil redeposition and durability to repeated home laundering in aqueous systems. There remains a need in the industry, however, for a textile treating composition which provides all of the aforementioned properties and advantages and, in addition, provides better resistance to soil redeposition during dry cleaning and higher fiber to fiber friction.

It has now been discovered that this need may be met by a polymer having a molecular weight from 2,000 to 10,000 and comprising a copolyester of ethylene glycol, polyethylene glycol having an average molecular weight of from 200 to 1000, aromatic dicarboxylic acid containing only carbon, hydrogen, and oxygen atoms and alkali metal salt of a sulfonated aromatic dicarboxylic acid containing only carbon, oxygen, hydrogen and sulfur atoms. The resin is partially crystalline. Textile materials containing polyester fibers which have been treated with one or more of these copolyesters exhibit excellent soil resistance, good wicking, improved cohesion, high fiber to fiber friction, and low yarn to metal friction, and excellent durability and resistance to soil redeposition during dry cleaning and home laundering.

Unless indicated otherwise, molecular weights of the polymers of this invention are calculated by end-group analysis according to the following formula:

$$\text{Molecular weight} = \frac{112,200}{\text{Acid No.} + \text{Hydroxyl No.}}$$

It is essential that the polyethylene glycol used to prepare the polymers of this invention have an average molecular weight from 200 to 1000 and preferably from 200 to 600. Polymers which do not contain groups derived from polyethylene glycol within the molecular weight range are unsuitable for imparting excellent properties to polyester textile materials treated therewith.

The polyethylene glycol may be replaced in part with monoalkylethers of polyethylene glycols, particularly the lower monoalkylethers such as methyl, ethyl, and butyl. Polypropylene glycols and higher alkylene glycols are generally not desirable because they tend to adversely effect the properties of the textile materials treated with the copolyesters. However, polyglycols which are copolymers of ethylene glycol and higher alkylene glycols may be used provided the higher alkylene glycol is only a minor portion of the polyglycol. A preferred polyethylene glycol is polyethylene glycol having a molecular weight of about 300.

The preferred aromatic dicarboxylic acid containing only carbon, hydrogen, and oxygen atoms is terphthalic acid. Illustrative examples of other dicarboxylic acids which may be used include isophthalic acid, phthalic acid, naphthalene dicarboxylic acids, anthracene dicarboxylic acids, biphenyl dicarboxylic acids, oxydibenzoic acids and the like.

It is also within the scope of the present invention to include a minor portion of an aliphatic dicarboxylic acid such as adipic, glutaric, succinic, trimethyladipic, pimelic, azelaic, sebacic, suberic, 1,4-cyclo-hexane dicarboxylic acid, and dodecanedioic acids in the copolymer. The specific amount of aliphatic dicarboxylic present in the copolymer is not critical, but is usually not more than about ten mole percent of the total amount of aromatic dicarboxylic acid used.

Illustrative examples of sulfonated aromatic dicarboxylic acids which may be used to prepare the copolymers of this invention include the alkali metal salts of 2-naphthyldicarboxy-benzene sulfonate, 1-naphthyl-dicarboxy-benzene sulfonate, phenyl-dicarboxybenzene sulfonate, 2,6-dimethylphenyl-3,5-dicarboxybenzene sulfonate and phenyl-3,5-dicarboxy-benzene sulfonate. The preferred sulfonated salt is 5-sulfoisophthalic acid sodium salt.

The relative amounts of (1) ethylene glycol, (2) polyethylene glycol, (3) dicarboxylic acid containing only carbon, hydrogen and oxygen, and (4 $\propto$) alkali metal salt of the sulfonated aromatic dicarboxylic acid used to prepare the copolymers of this invention may vary over a very wide range. It is preferred to use an excess of (1) and (2) over (3) and (4) so that the end-groups of the resulting copolyester are largely, but not necessarily exclusively, hydroxyl groups. Taking the molar amount of the alkali metal salt of the sulfonated aromatic dicarboxylic acid as one, the relative molar amounts of the other reactants are as follows: The molar amount of aromatic dicarboxylic acid (3) is from 1 to 8 and preferably from 3 to 8; (11–26 mol % sulfonated acid based on total acids); and the amount of polyethylene glycol is from 0.1 to 2 and preferably from 0.2 to 1.0, most preferred 0.2–0.65 (2–15 mol % polyethylene glycol when based on total diol). The balance of the polymer is largely ethylene glycol and the amount of ethylene glycol in the product is such that the moles of polyol is larger than the moles of dicarboxylic acid and the copolyester is terminated mainly but not exclusively with hydroxyl groups. Sufficient ethylene glycol is used to give a copolyester having a molecular weight from 2,000 to 10,000. When unreacted ethylene glycol is distilled from the reaction mixture the polyester contains from 2 to about 25% molar excess of diol based on mols of diacid.

The copolyesters of our invention may be prepared by techniques conventional in the art for the preparation of copolyesters of glycols and dicarboxylic acids.

The preferred method for preparing the copolyester comprises reacting the desired mixture of lower alkyl esters (methyl, ethyl, propyl or butyl) of the dicarboxylic acids with a mixture of ethylene glycol and polyethylene glycol. The glycol esters and oligomers produced in this ester interchange reaction are then polymerized to the desired molecular weight. The ester interchange reaction may be conducted in accordance with reaction conditions generally used for ester interchange reactions. This ester interchange reaction is usually conducted at temperatures of 120° C. to 210° C. in the presence of an esterification catalyst. Alkanol is formed and constantly removed thus forcing the reaction to completion. The temperature of the reaction should be controlled so that ethylene glycol does not distill from the reaction mixture. Higher temperatures may be used if the reaction is conducted under pressure.

The catalysts used for the ester interchange reaction are those well known to the art. They include alkali and alkaline earth metals e.g. Li, Na, Ca, Mg and Transition and Group IIB metals e.g. Mn, Co, Zn and are usually added as the oxides, carbonates or acetates.

The extent of the ester interchange reaction can be followed by the amount of methanol liberated or the disappearance of the dialkyl dibasic acids in the reaction mixture as determined by high performance liquid chromatography or any other suitable technique. The ester interchange reaction should be taken to more than 90% completion. Greater than 95% completion is preferred in order to decrease the amount of sublimates obtained in the polymerization step.

Stabilizers such as phosphorus and phosphoric acid and esters thereof may be added at the end of the ester interchange step. The purpose of the stabilizer is to inhibit degradation, oxidation, and other side reactions; destroy the catalytic activity of the ester interchange catalyst; and prevent precipitation of insoluble metal carboxylates.

When the ester interchange reaction is complete, the glycol ester products are then polymerized to produce copolymers with a molecular weight of at least 2,000. The polymerization reaction is usually conducted at temperatures from about 220° C. to about 290° C. in the presence of a catalyst. Higher temperatures may be used but tend to produce darker colored products. Illustrative examples of catalyst useful for the polymerization step include antimony trioxide, germanium dioxide, titanium alkoxide, hydrated antimony pentoxide, and ester interchange catalysts such as salts of zinc, cobalt and manganese.

Excess ethylene glycol and other volatiles liberated during the reaction are removed under vacuum. The reaction is continued until the molecular weight of the polymer, as determined by end-group analysis, is at least 2,000. Higher molecular weight copolymers, for example above 3,000, are particularly desirable because they are more easily dispersed in water. Polymerization is usually stopped just before the reaction mixture becomes too viscous to agitate and before removal from the reaction vessel becomes a problem. A practical upper limit for the molecular weight is about 10,000.

The ester interchange reaction can be conducted in various ways to produce functional products. Illustrative examples of conducting the ester interchange reaction include:

(1) All of the components, dicarboxylic dialkyl esters, ethylene glycol, and polyethylene glycol, can be charged as the start and ester interchanged together. This technique is illustrated in Example 1;

(2) The lower alkyl esters of the dicarboxylic acids can be charged to the mixture of ethylene glycol and polyethylene glycol sequentially and ester interchanged in sequence. This technique is illustrated in Example 8. It is understood that all of the components of the copolyester must be present before the polymerization reaction occurs;

(3) The ester interchange of dimethyl terephthalate with glycol and the ester interchange of dimethyl sulfoisophthalate, sodium salt with glycol can be conducted in separate vessels and combined for the polymerization step. Aliphatic dicarboxylic acid can be introduced in either of these separate reactions. This method is illustrated in Example 11.

The copolymers of this invention are particularly useful for treating textile materials containing polyester fibers, and are particularly useful with textile materials which are 100% polyester or polyester-cotton blends. The particular form of the textile articles to be treated in accordance with the present invention is not important and includes filaments, fibers, fabrics and films.

In order to treat textile materials with the copolymers of this invention it is essential to heat the copolymer in contact with the surface of the textile material. Where a dispersion or solution of the anionic textile treating composition is used, the continuous phase or solvent may be removed by the same or by a previous thermal treatment or it nay be allowed to evaporate before thermal treatment. Preferably, the copolymers are applied to the textile materials from an aqueous dispersion. The textile treating composition may be applied directly from a continuous phase, for example by using techniques normally used for dyeing textile materials with dispersed dyestuffs. After the textile material is contacted with the copolyester it is heated to an elevated temperature to heat set. The temperature required to produce a durable treatment of the textile material is about 90° C. or above and preferably the temperature should not exceed 150° C. Obviously the temperature should not be so high as to melt or damage the textile material being treated, so temperatures above the melting point of the textile materials can only be applied for very short times.

It is useful, particularly when the active group or groups of the textile material or the textile treating composition are affected by atmospheric oxygen at the temperature of the thermal treatment, to carry out the thermal treatment in the presence of an antioxidant. The antioxidant may be present as a separate compound dissolved or dispersed in the treating composition. In general, the antioxidant used may by any antioxidant generally used in the art for stabilizing polyethers from thermal degradation. In considering those most suitable in the present invention it is necessary to satisfy the criteria that the antioxidant should be stable and effective at the temperature employed in the thermal treatment and that it should produce no undesirable color or odor. For example, Santonox R or Irganox 858, pyrogallol, or zinc diethyldithiocarbamate may be used. A combination of two or more antioxidants may give better results than either antioxidant alone. Thus, for example, a mixture of zinc dinonyldithiocarbamate with 2-alpha-methylcyclohexyl-4, 6-dimethylphenol is more effective than either antioxidant used alone.

The nature of the polyesters of this invention and methods for their preparation and use will be better understood from a consideration of the following examples which are presented for illustrative purposes. All parts and percentages are by weight unless otherwise specified.

EXAMPLE 1

Dimethyl terephthalate 242.8 g (1.25 moles), 74.3 g (0.25 moles) dimethylsulfoisophthalate sodium salt, 6.55 g (0.0376 moles) dimethyl adipate, 374 g (6.03 moles) ethylene glycol, 0.63 g calcium acetate monohydrate, 36 g (0.12 moles) polyethylene glycol 300 and 0.019 g antimony oxide are charged to a one liter 3NRB flask. The flask is equipped with an agitator, thermocouple, nitrogen inlet and a steam condenser leading to a Barrett trap exiting to a condenser, dry ice trap and nitrogen bubbler. The mixture is flushed with nitrogen and heated under a nitrogen flow of about 50–100 cc/min. The reaction mixture becomes homogeneous at 140° C. and volatiles (methanol) are distilled off at about 150° C. After 35 min. at 150° the distillation ceases and the mixture is taken to 175° C. and left there until the distillation stops again (15 min.). The reaction mixture is then taken to 200° C. and kept at this temperature for 1.5 hours. The total volatiles collected weigh 68.5 g. Phosphorous acid (0.36 g) is added and a vacuum (25 mm) is applied. The mixture is heated to 280° C. over a 1 hour period. After 7 min. at 280° C. the mixture becomes viscous and the product (362.6 g) is dumped into an aluminum pie pan and allowed to solidify. The product has an acid number=4.8, saponification number=464 and a hydroxyl number of 45.8, a molecular weight of 2217*, 7.06 mol % polyethylene glycol (based on total diol)*, and 16.3 mol % sulfoisophthalic acid salt based on total diacid), and 13.3% excess diol.
*calculated using the end group analysis

EXAMPLES 2 TO 6

Using the procedure described in Example 1 the following copolyesters are produced.

| Example | 2 | 3 | 4 | 5 | 6 |
|---|---|---|---|---|---|
| DMT | 292.5 | 292.5 | 242.8 | 1165 | 485.6 |
| DMSI | 74.3 | 74.3 | 74.3 | 592.5 | 148.6 |
| DMA | 6.55 | — | — | 52.2 | — |
| PEG-300 | 36.0 | 36.0 | 56.4 | 300 | 150* |
| E.G. | 374 | 374 | 360.8 | 1482 | 729 |
| Ca(Ac)$_2$—H$_2$O | 0.63 | 0.63 | 0.63 | — | 1.26 |
| Sb$_2$O$_3$ | 0.019 | 0.019 | 0.019 | 0.152 | 0.038 |
| H$_3$PO$_3$ | 0.36 | 0.36 | 0.36 | 2.88 | 0.72 |
| Mn(Ac)$_2$—4H$_2$O | — | — | — | 7.0 | — |
| Acid Number | 2.4 | 5.3 | 4.6 | 11.0 | 11.8 |
| Sap Number | 466 | 468 | 445 | 416 | 411 |
| OH Number | 44.7 | 45.6 | 38.1 | 30.0 | 25.1 |
| Mole Wt | 2400 | 2200 | 2600 | 2700 | 3000 |
| Mol % PEG-300** | 6.13 | 6.21 | 7.34 | 11.0 | 7.73 |
| Mol % DMSI*** | 14.0 | 14.3 | 16.7 | 24.1 | 16.7 |
| Mol % Excess Diol | 11.9 | 10.4 | 8.89 | 13.2 | 7.68 |

DMT — Dimethyl terephthalate
DMSI — Dimethylsulfoisophthalate sodium salt
DMA — Dimethyl adipate
PEG-300 — Polyethylene glycol (molecular weight = 300)
E.G. — Ethylene glycol
Mole Wt — Molecular weight
*Polyethylene glycol (molecular weight = 600);
**based on total diol;
***based on total diacid

EXAMPLE 7

Terephthalic acid (830.8 g), 268.2 g 5-sulfoisophthalic acid sodium salt, 21.9 g adipic acid, 999 g ethylene glycol, 12.9 g calcium acetate monohydrate, 150 g Carbowax 300 and 0.90 g antimony oxide are charged to a 3NRB flash equipped with a nitrogen inlet, thermocouple, agitator, and a Dean Stark trap exiting to a dry ice trap and bubbler. The mixture is flushed with nitrogen and is heated to 200° C. under a slight nitrogen flow. The mixture is reacted at this temperature for about 27 hours. At the end of this time the reaction mixture has an acid number of five and about 490 g volatiles are recovered in the Dean Stark trap. Phosphoric acid (23.5 g 85%) is added and the mixture is heated to 270° C. under a nitrogen atmosphere. After 1 hour at 270° C. about 152 g volatiles are recovered and the nitrogen flow is discontinued and a vacuum (20 mm) is applied. After 10 min. under vacuum the product (1509.2 g) becomes very viscous and it is dumped into an aluminum pie pan and allowed to solidify. The product had an acid number=25, sap number=478, hydroxyl number=26.3 and %S=2.11. The molecular weight is 2200*, the mol % of polyethylene glycol (based on total diol*) is 7.38 and the mol% sulfonic acid salt is 16.3% (based on total acids), the excess diol is 13.5 mol %.
*calculated using the end group analysis

EXAMPLE 8

Dimethyl terephthalate 1165 g (6 moles), 738 g (11.9 moles) ethylene glycol and 7.56 g calcium acetate monohydrate are charged to a one liter 3NRB flask equipped as in the previous example. The mixture is flushed with nitrogen and heated to 200° C. and kept at this temperature for a total of 13.25 hours. Volatiles (methanol) started distilling when the reaction mixture reaches 130° C. An additional 44 g ethylene glycol is added during the last 1 hour to drive the reaction to completion. A total of 362.2 g volatiles are recovered. The charge was cooled and 592.5 g (2.0 moles) dimethyl sulfoisophthalate, sodium salt, 52.2 g (0.30 moles) dimethyl adipate, 239 g (3.85 moles) ethylene glycol, 300 g (1 mole) Carbowax 300 and 2.52 g calcium acetate monohydrate is added and reacted at temperatures up to 200° C. for a period of 8.5 hours. About 110.1 g volatiles are recovered. The product is neutralized with 5.76 g phosphorous acid and 0.152 g antimony oxide is added. A vacuum (25 mm) is applied and the mixture is heated to 282° C. over a 1.5 hour period during which time 464.8 g volatiles are recovered. The product 2,133 g is dumped into an aluminum pan and allowed to solidify.

EXAMPLE 9

Dimethyl terephthalate (1165.0 g, 6 moles), 592.5 g (2 moles) dimethyl sulfoisophthalate sodium salt, 52.2 g (0.30 moles) dimethyl adipate, 300 g (1.0 moles) polyethylene glycol (mole weight 300), 1184.0 g, (19.08 moles) ethylene glycol, 3.55 g manganese acetate tetrahydrate and 0.152 g antimony trioxide are charged to a 5 liter 3 neck round bottom flask equipped with an agitator, a thermocouple, nitrogen inlet and a Dean-Stark trap exiting through a condenser, dry ice trap and a nitrogen bubbler. The charge is flushed with nitrogen and heated slowly to 200° C. over a period of 10.5 hours under a slight nitrogen flow. During this time, 520 g of volatiles are collected indicating that the ester interchange reaction is about 98% completion. The mixture is cooled to 150° C. and 1.44 g of phosphorus acid in 2 ml water is added. It is then heated up to 280° C. over approximately 1.5 hour period while applying a vacuum of 25 mm Hg. The product is vacuum stripped at 280° C. for about 7 minutes until it became viscous. The product weighs 2106 g and the volatiles 624.7 g. The product is discharged into an aluminum pan and allowed to solidify. It has an acid number=10.7, hydroxyl number=21.5 and a molecular weight of 3500*, a polyethylene glycol content of 11.2 mol % (based on total diol*) and a sulfonic acid salt content of 24.1 mol % based on total acids, the excess diol is 11.2 mol %.
*calculated using the end group analysis

EXAMPLE 10

Dimethyl terephthalate 1165.0 g (6 moles), 592.5 g (2 moles) dimethyl sulfoisophthalate sodium salt, 52.2 g (0.30 moles) dimethyl adipate, 300 g (1.0 moles) polyethylene glycol (mole weight 300), 1020 g (16.44 moles) ethylene glycol, 10.08 g calcium acetate monohydrate and 0.152 g antimony trioxide, are charged to a 5 liter 3 neck round bottom flask equiped with an agitator, thermocouple, nitrogen inlet and a Dean-Stark trap exiting through a condenser, dry ice trap and a nitrogen bubbler. The charge is flushed with nitrogen and slowly heated to 200° C. over a period of 12 hours. During this time, 504 g of volatiles are recovered which corresponds to about 95% completion of the ester interchange reaction. The product is cooled to 150° C. and 5.76 g phosphorus acid dissolved in ca. 5 ml. water is added. It is then heated up to 280° C. over approximately 1 hour and fifty minutes while applying a vacuum of 25 mm Hg. The product is vacuum stripped at 280° C. for about 10 minutes until it becomes viscous. The product weighs 2112 g and the volatiles 472 g. The product is discharged into an aluminum pan and allowed to solidify. It has an acid number=7.2, hydroxyl number=18.5 and molecular weight of 4300*, a polyethylene glycol content of 11.4 mol % (based on total diol*) and a sulfonic acid salt content of 24.1 mol % (based on total acids), and an excess diol content of 9.64%.
*calculated using the end group analysis

EXAMPLE 11

Dimethylsulfoisophthalate, sodium salt (592.5 g, 200 moles), 52.2 g (0.300 moles) dimethyl adipate, 300 g (1.00 moles) Carbowax 300, 437.1 g (7.04 moles) ethylene glycol and 2.79 g calcium acetate monohydrate are charged to a one liter 3NRB flask. The flask is equipped with an agitator, thermocouple, nitrogen inlet, and a steam condenser leading to a Barrett trap exiting to a condenser, dry ice trap and nitrogen bubbler. The mixture is flushed with nitrogen and heated to 195° C. under a slight nitrogen flow. It is left at this temperature for about 1.8 hours during which time about 144 g volatiles (methanol) are collected. The product is cooled to 150° C. and 1.6 g phosphorous acid is added. the product is cooled and labeled I.

Dimethyl terephthalate (1165 g, 6.00 moles), 930.8 g (15.0 moles) ethylene glycol, 3.65 g calcium acetate monohydrate are reacted in the same manner as described above until 384.4 g volatiles are recovered (4.5 hours). The product is neutralized with 2.08 g phosphorous acid. It is cooled and labeled II.

I (621 g) and 866.2 g II are charged to a 3NRB flask containing an agitator, thermocouple, nitrogen inlet and takeoff to a condenser, receiver, dry ice trap, vacuum gauge and vacuum pump. The mixture is flushed with nitrogen and heated to 180°-200° C. until it becomes homogeneous. Antimony oxide (0.1 g) is added, a vacuum (25 mm) is applied, and the mixture is heated to 280° C. over a period of 52 minutes. It is left at this temperature for another five minutes until a total of 386.5 g volatile is recovered. The vacuum is broken with nitrogen and the product (1088.2 g) was dumped and allowed to solidify. It has an acid number of 7.2, saponification number of 422, and hydroxyl number of 38.5. The molecular weight is 2455*, the polyethylene glycol content is 10.9 mol % (based on total diol*), the sulfonic acid salt content is 24.1 mol % based on the total acids and an excess glycol content of 14.4%.
*calculated using the end group analysis

EXAMPLE 12

Dimethyl terephthalate (1165 g, 6.00 moles), 592.2 g (2.00 moles) dimethyllsulfoisophthalate, sodium salt, 52.2 g (0.300 moles) dimethyladipate, 300 g (1.00 moles) Carbowax 300, 1998 g (32.2 moles) ethylene glycol, 5.04 g calcium acetate monohydrate and 0.152 g antimony oxide are reacted at temperatures up to 200° C. as described in experiment 10 until 506 g volatiles are recovered. Phosphorous acid, 2.88 g, is added to this product and the mixture is polymerized under vacuum to a temperature of 280° C. The product is discharged into an aluminum pan and allowed to solidify. It has an acid number=11.2, and hydroxyl number=24.0. The molecular weight is 3187*, the polyethylene glycol content is 11.2 mol % (based on total diol*), the sulfonic acid salt content is 24.1%, and an excess glycol content of 11.9%.
*calculated using the end group analysis As can be seen by the data presented in the following Tables, textile materials treated with copolymer of this invention have excellent physical properties. These data are obtained by the following procedure:

Anionic textile treating compositions are prepared by adding 14 parts of the indicated copolymer, 0.1 part of a bactericide, 0.16 part of antioxidant, and 0.24 part of polyoxyethylene (9) nonylphenol as emulsifier to 85.5 parts of water at room temperature. The water is heated to 180° F. with stirring and held at that temperature until the copolymer is completely dispersed. The resulting dispersion applied to 100% poly (ethylene terephthalate) taffeta fabric at the rate of 0.14 parts by weight of copolyester per 100 parts by weight of fabric. The treated fabric is cooled to 100°-120° F., rinsed in water at 120° F., dried, and then heated to 350° F. for thirty seconds to heat-set the finish. The soil release, soil redeposition, frictional and wicking properties of the treated polyester fabric are determined and shown in the following Tables II, III, IV and V.

SOIL RELEASE

The purpose of this test is to measure the ability of a fabric to release stains during home laundering. (Oily stains like used motor oil, mineral oil, olive oil, corn oil, etc., are frequently employed, but many other stains such as ketchup, French dressing, mustard, chocolate syrup, grape juice, etc., may be used). Therefore the method can be used to check the performance of soil release finishes designed to facilitate the removal of soils during washing. Tests conducted before washing and again after mulitiple washes serve to show the durability of the finish to laundering.

Swatches of fabric to be tested, i.e., those treated with soil release finishing agents and untreated controls, are stained with a drop of used motor oil (or other desired stain) and allowed to stand for at least five minutes so that the drop can spread out and penetrate into the fabric. Viscous or pasty stains are rubbed into the fabric with a spatula.

The stained fabrics are then washed in an automatic washing machine under controlled conditions using 1 gram per liter of Tide detergent, a 120° F. wash temperature, a "small load" setting and a cold water rinse. The fabrics are then dried on the "high" setting in an automatic dryer. A 1"×1" square section containing the stained portion of fabric is cut out and mounted. (This is the "1 wash" sample). The staining, washing and drying procedure is repeated on the remaining portion of fabric to get a "2 wash" sample. The bulk of the fabric is washed two more times, dried, then stained and washed again to prepare a "5 wash sample. In the same way 10 or more washes may be carried out if desired.

The samples (1 wash, 2 wash, 5 wash, etc.) are then rated according to how well the stain has been removed by a single laundering:

5 = Very Good (total stain release)
4 = Good (Significant but not total stain release)
3 = Moderate (Moderate stain release)
2 = Poor (Partial stain release)
1 = Failure (No stain release)

The performance of a soil release finish is judged by comparing its rating to that of a control (unfinished) fabric. The multiple-wash samples show the degree of durability of the soil release finish to laundering.

TABLE II

| Copolymer of Example No. | Soil Release Performance | | | | | | | | | | |
|---|---|---|---|---|---|---|---|---|---|---|---|
| | 1 | 2 | 3 | 4 | 5 | 6 | 9 | 10 | 11 | 12 | (A) |
| 1 Wash | 5 | 5 | 5 | 5 | 5 | 5 | 5 | 5 | 5 | 5 | 5 |
| 2 Washes | 5 | 5 | 5 | 5 | 5 | 5 | 4–5 | 5 | 5 | 5 | 5 |
| 5 Washes | 4–5 | 4–5 | 4–5 | 4 | 4–5 | 4–5 | 4 | 4–5 | 4–5 | 5 | 4 |
| 10 Washes | 4 | 3 | 2 | 3 | 2–3 | 3–4 | 4 | 4–5 | 4–5 | 4 | 1 |

(A) - Commercially available copolymer of ethylene glycol-polyoxyethylene glycol-terephthalic acid.

SOIL REDEPOSITION

When soiled fabrics are laundered, the degree of cleanliness achieved depends upon the ability of the detergent solution used to (a) remove soils from the fibers and (b) keep those soils suspended in the solution so that they will not redeposit on the fabric.

The purpose of this test is to measure the degree of soil redeposition that occurs on a fabric during the laundering process. It can be used to test the effectiveness of fabric finishes in preventing soil redeposition.

The test is carried out by placing a 3"×3" swatch of the unsoiled fabric to be tested in a 300 ml. Launder-Ometer can, adding 100 ml. of a 1 gram liter solution of Tide detergent, four 3"×3" swatches of an artificially-soiled flannelette fabric, and ten ¼" diameter stainless steel balls for agitation. (The flannelette fabric contains a standard soil consisting of carbon black, a fatty glyceride, and mineral oil). The can is then capped and mounted in the Launder-Ometer. When the machine is turned on the contents of the can are agitated and tumbled while being heated to 176° F. and during the 45 minutes run at that temperature. During the operation soils are removed from the flannelette fabric due to the action of the detergent, and a certain amount of these soils are redeposited on the clean test fabric.

After laundering, the samples are rinsed, dried, pressed, and assessed for degree of soil redeposition according to the following rate:

VG = Very Good (No soil pick-up)
G = Good (Slight soil pick-up)
M = Moderate (Moderate soil pick-up)
F = Fair (Significant soil pick-up)
P = Poor (Excessive soil pick-up)

When soil release finishes are being evaluated, an unfinished control is included in the test for comparison. Performance is usually checked on samples of the finished fabric that have not been washed, and on samples that have been washed two and five times by a standard procedure in an automatic washer. The performance of the washed samples gives an indication of the durability of the finish to repeated home launderings.

TABLE III

| Copolymer of Example No. | Soil Redeposition | |
|---|---|---|
| | 12 | (A) |
| 0 Wash | G | F |
| 1 Wash | G | F |
| 5 Washes | G | F |
| 10 Washes | G | F |

(A) - Commercially available copolymer of ethylene glycol-polyoxyethylene glycol-terephthalic acid.

YARN FRICTION

The Atlab Yarn Friction Tester is used to measure frictional properties of yarns under controlled conditions. The numerical values obtained make it possible to characterize a given yarn and, to a degree, predict how that yarn will perform during certain stages of processing and after it has been woven or knitted into a fabric. The tester can be used to evaluate the performance of finishes (lubricants, cohesive agents, etc.) simply be applying those finishes and measuring their effects on the frictional behavior of the yarn.

Yarns to be tested are prepared, wound on cones, and conditioned for at least 16 hours in a controlled atmosphere (usually 65% relative humidity and 75° F.) in the laboratory where the measurements are to be made. The test is conducted by feeding the yarn into the machine, applying a certain, predetermined tension ($T_1$), and causing it to run at a selected, constant speed over a friction-producing surface. For yarn-to-metal measurements the surface is in the form of two or three stainless steel pins. For yarn-to-yarn measurements a friction-producing surface is made by twisting a loop of yarn so that the moving yarn rubs against itself.

After passing over the metal or yarn surface, the tension in the yarn increases from the initial value ($T_1$) to a new, higher value ($T_2$). The increase in tension ($T_2-T_1$, or $T_f$) is directly related to the amount of friction developed at that surface. A finish applied to the yarn may increase or decrease friction compared to an unfinished control yarn, and it often will improve friction uniformity to minimize tension variations in the yarn. During the test, the increase in tension, $T_f$, is automatically recorded on a chart.

Yarn-to-metal tests are usually run at high speeds, e.g., 10, 50, and 100 meters per minute. Average $T_f$ values, in grams, are read from the curves traced on the chart.

Yarn-to-yarn tests are run at much slower speeds. For example, the yarn may be moving at only one centimeter per minute. The curves produced may be smooth or they may have a stick-slip or saw-tooth pattern. Average $T_f$ values are read from the charts and reported in grams. In addition, a ± value is used to show the degree of stick-slip variation above and below the average value. (For a smooth curve the ± value would be zero). A high stick-slip value indicates a greater degree of cohesion between yarns, filaments and fibers.

In general a low yarn-to-metal friction value is desirable. Lubricants are routinely employed to reduce friction between the yarn and guides or other metallic parts of the processing equipment. Effective lubricants permit high production speeds without damage to the yarn.

A low yarn-to-yarn friction with no stick-slip effect evident in the curve indicates that yarns, filaments or fibers will slide easily over one another. This can be desirable in a fabric since it will result in a low flex stiffness (resistance to bending) and produce a soft feel or "hand." Frequently, however, a higher yarn-to-yarn friction with some cohesion is important. In the processing of filament yarns, for example, some cohesion is needed to maintain the integrity of the yarn bundle and prevent snagging of individual filaments. Cohesion is also required to prevent slippage and permit yarns to be wound into firm, stable packages such as cones and pirns. In certain fabrics, especially delicate ones, too little cohesion can result in slippage of one yarn over another and result in serious defects.

TABLE IV

| Copolymer of Example No. | Frictional 12 | (A) |
|---|---|---|
| Yarn to Yarn ($T_f$) | 72 ± 28 | 12 ± 0 |
| Yarn to Metal ($T_f$) | | |
| 10 M/min. | 44 | 200 |
| 50 M/min. | 52 | 180 |
| 100 M/min. | 60 | 180 |

(A) - Commercially available copolymer of ethylene glycol-polyoxyethylene glycol-terephthalic acid.

WICKING

The purpose of this test is to determine the vertical wicking rate of fabrics, which is a measure of their moisture transfer characteristics. It can be used to evaluate fabric finishes designed to impart hydrophilic properties to fabrics.

Strips of the fabrics to be tested (1"×8"), all cut in the same direction of the fabric, are used in the test. If hydrophilic finishes are being tested, an unfinished control fabric should be included for comparison. Unwashed fabric and fabrics that have been laundered one or more times can be included to check the durability of the finishes to washing. All fabrics to be tested are allowed to remain at ambient atmospheric conditions for at least 16 hours before testing.

The test is carried out by raising a beaker of water until the surface of the water just meets the bottom edge of the vertically-suspended fabric strip, and measuring the wicking rate by recording the height of liquid rise on the fabric at intervals of one, five, and ten minutes. (A suitable dye, added to the water, produces a colored solution that makes it easier to observe the exact position of the advancing liquid front.)

Wicking heights at a given time are compared. The greater the wicking height the better the moisture transfer characteristics of the fabric. Good moisture transfer contributes to the comfort of apparel items, particularly for garments worn against the skin.

TABLE V

| | Wicking (In CM.) | | | | | | | |
|---|---|---|---|---|---|---|---|---|
| Copolymer of Example No. | 2 | 3 | 4 | 5 | 6 | 9 | (A) | Untreated |
| 0 Wash | | | | | | | | |
| 1 Min. | 3.0 | 3.5 | 3.5 | 4.5 | 5.5 | 3.5 | 6.0 | 3.0 |
| 5 Min. | 6.0 | 6.0 | 6.0 | 8.0 | 6.0 | 11.0 | 10.0 | 4.0 |
| 10 Min. | 8.0 | 7.0 | 8.0 | 9.0 | 8.5 | 13.0 | 11.0 | 5.0 |
| 1 Wash | | | | | | | | |
| 1 Min. | 8.0 | 8.0 | 8.0 | 9.0 | 9.0 | 9.0 | 10.0 | 7.0 |
| 5 Min. | 12.0 | 13.0 | 12.0 | 14.0 | 12.5 | 13.0 | 16.0 | 10.0 |
| 10 Min. | 14.0 | 14.0 | 14.0 | 16.0 | 14.0 | 14.0 | 18.0 | 12.0 |
| 2 Wash | | | | | | | | |
| 1 Min. | 5.5 | 6.5 | 6.0 | 8.0 | 7.0 | 7.5 | 9.0 | 5.0 |
| 5 Min. | 9.0 | 11.0 | 9.0 | 12.0 | 11.0 | 12.0 | 12.7 | 7.5 |
| 10 Min. | 11.0 | 13.0 | 11.0 | 15.0 | 12.0 | 13.5 | 14.0 | 9.0 |
| 5 Wash | | | | | | | | |
| 1 Min. | 9.0 | 8.5 | 9.0 | 10.0 | 9.5 | 9.5 | 10.0 | 8.0 |
| 5 Min. | 12.0 | 12.0 | 13.0 | 14.0 | 12.0 | 13.0 | 14.0 | 11.0 |
| 10 Min. | 14.0 | 16.0 | 14.0 | 16.0 | 14.0 | 16.0 | 15.0 | 12.0 |
| 10 Wash | | | | | | | | |
| 1 Min. | 5.0 | 7.0 | 8.0 | 7.0 | 5.5 | 6.0 | 8.0 | 6.5 |
| 5 Min. | 7.0 | 10.0 | 11.0 | 9.0 | 9.0 | 9.0 | 11.0 | 9.0 |
| 10 Min. | 9.0 | 12.0 | 12.5 | 11.0 | 11.0 | 11.0 | 13.0 | 9.0 |

(A) - Commercially available copolymer of ethylene glycol-polyoxyethylene glycol-terephthalic acid.

Although this invention has been described with reference to specific compositions and textile materials, it will be apparent that still other different and equivalent compositions and textile materials may be substituted for those specifically described herein, all within the sphere and scope of this invention.

Having described the invention, what is desired to be secured by Letters Patent is:

1. A copolyester having a molecular weight of from 2,000 to 10,000 and comprising a copolyester of (1) ethylene glycol, (2) polyethylene glycol having an average molecular weight of from 200 to 1000, (3) aromatic dicarboxylic acid containing only carbon, hydrogen, and oxygen atoms, and (4) an alkali metal salt of a sulfonated aromatic dicarboxylic acid containing only carbon, hydrogen, oxygen, and sulfur atoms, wherein the molar ratio of (2) to (4) is from 0.1 to 2.0, and the molar ratio of (3) to (4) is from 1 to 8.

2. A copolyester of claim 1 having a molecular weight of from 2,000 to 10,000, the polyethylene glycol has a molecular weight of from 200 to 600, the aromatic dicarboxylic acid (3) is terephthalic acid, the alkali metal salt (4) is the sodium salt of sulfoisophthalic acid, the molar ratio of (2) to (4) is from 0.2 to 0.65, and the molar ratio of (3) to (4) is from 3 to 8.

3. A copolyester of claim 2 wherein the polyethylene glycol has a molecular weight of about 300.

4. A copolyester of claim 1 prepared by the reaction of dialkyl esters of the dicarboxylic acids with a mixture of ethylene glycol and polyethylene glycol.

5. An anionic textile treating composition comprising an aqueous dispersion of a copolyester of claim 1.

6. An anionic textile softening composition of claim 5 wherein the aromatic dicarboxylic acid containing only hydrogen, carbon, and oxygen atoms is benzene dicarboxylic acid.

7. An anionic textile treating composition of claim 6 wherein the benzene dicarboxylic acid is terephthalic acid.

8. An anionic textile treating composition of claim 7 wherein the molar ratio of acid (3) to salt (4) is from 3 to 8 and the alkali metal salt is the sodium salt.

9. An anionic textile treating composition of claim 5 wherein the copolyester contains an aliphatic dicarboxylic acid selected from the group consisting of glutaric, succinic, dimethyladipic, pimelic, azelaic, sebacic, suberic, 1,4-cyclohexane dicarboxylic acid, dodecanedioic and adipic.

10. An anionic textile composition of claim 9 wherein the aliphatic dicarboxylic acid is adipic acid.

11. An anionic textile treating composition of claim 10 wherein the amount of adipic acid is not more than 0.5 moles of adipic acid per mole of the sodium salt (4).

12. An anionic textile treating composition of claim 5 wherein the copolyester is prepared by an ester interchange reaction.

13. An anionic textile treating composition of claim 12 wherein the copolyester is prepared by polymerizing a mixture of dihydroxyethyl esters of aromatic dicarboxylic acid containing only carbon, hydrogen, and oxygen atoms and an alkali metal salt of a sulfonated aromatic dicarboxylic acid containing only carbon, hydrogen, oxygen, and sulfur atoms and low molecular weight oligomers thereof, in the presence of polyethylene glycol having a molecular weight of from 200 to 1000 to form a copolyester having a molecular weight of from 2,000 to 10,000.

14. A process of preparing a textile material which comprises contacting a textile material containing polyester with an aqueous dispersion of claim 5 and heating at a temperature above 90° C.

15. A process of preparing a textile material which comprises contacting a textile material containing polyester with an aqueous dispersion of claim 9 and heating at a temperature above 90° C.

16. A process of preparing a textile material which comprises contacting a textile material containing polyester with an aqueous dispersion of claim 13 and heating at a temperature above 90° C.

17. Textile material which has been treated with an anionic textile treating composition of claim 1.

18. Textile material containing polyester which has been treated with an anionic textile treating composition of claim 10.

19. Textile material containing polyester which has been treated with an anionic textile treating composition of claim 13.

20. An anionic textile treating composition comprising as aqueous dispersion of a copolyester of claim 2.

* * * * *